Jan. 10, 1967 W. M. RIPPLE 3,297,132
ORIENTATION DEVICE
Filed Feb. 19, 1965 5 Sheets-Sheet 5

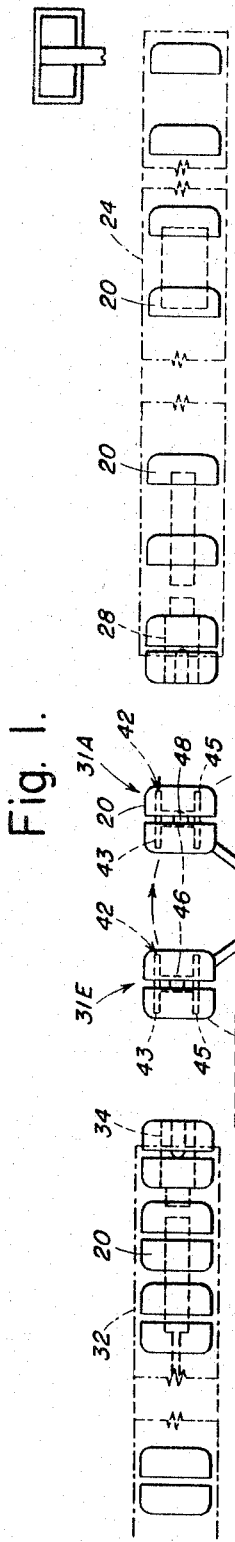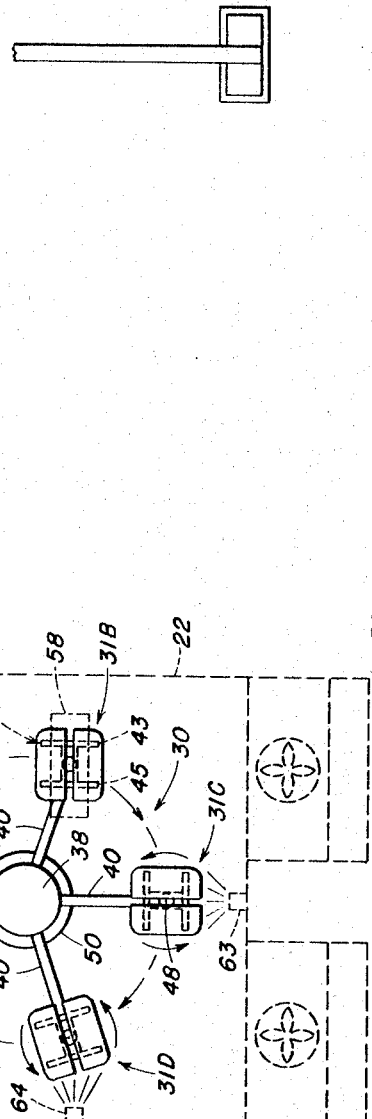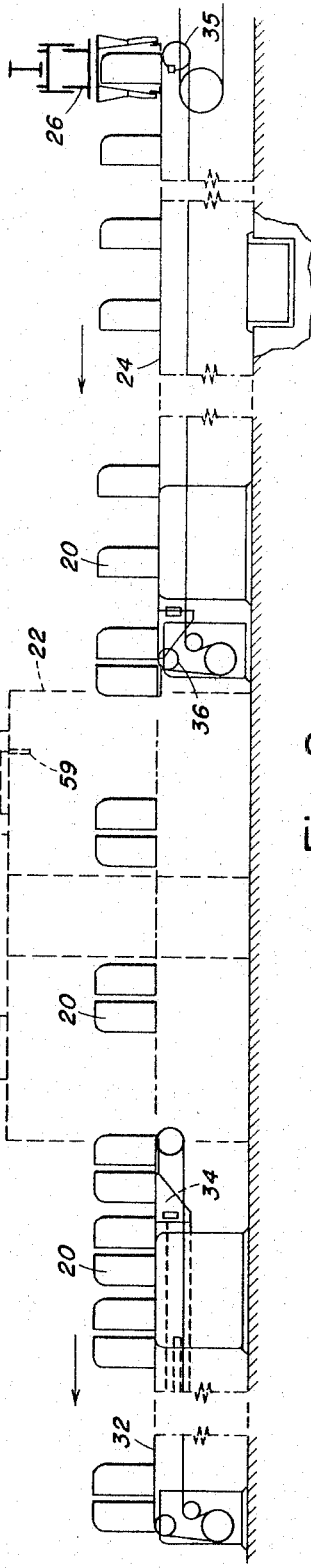
Fig. 1.
Fig. 2.

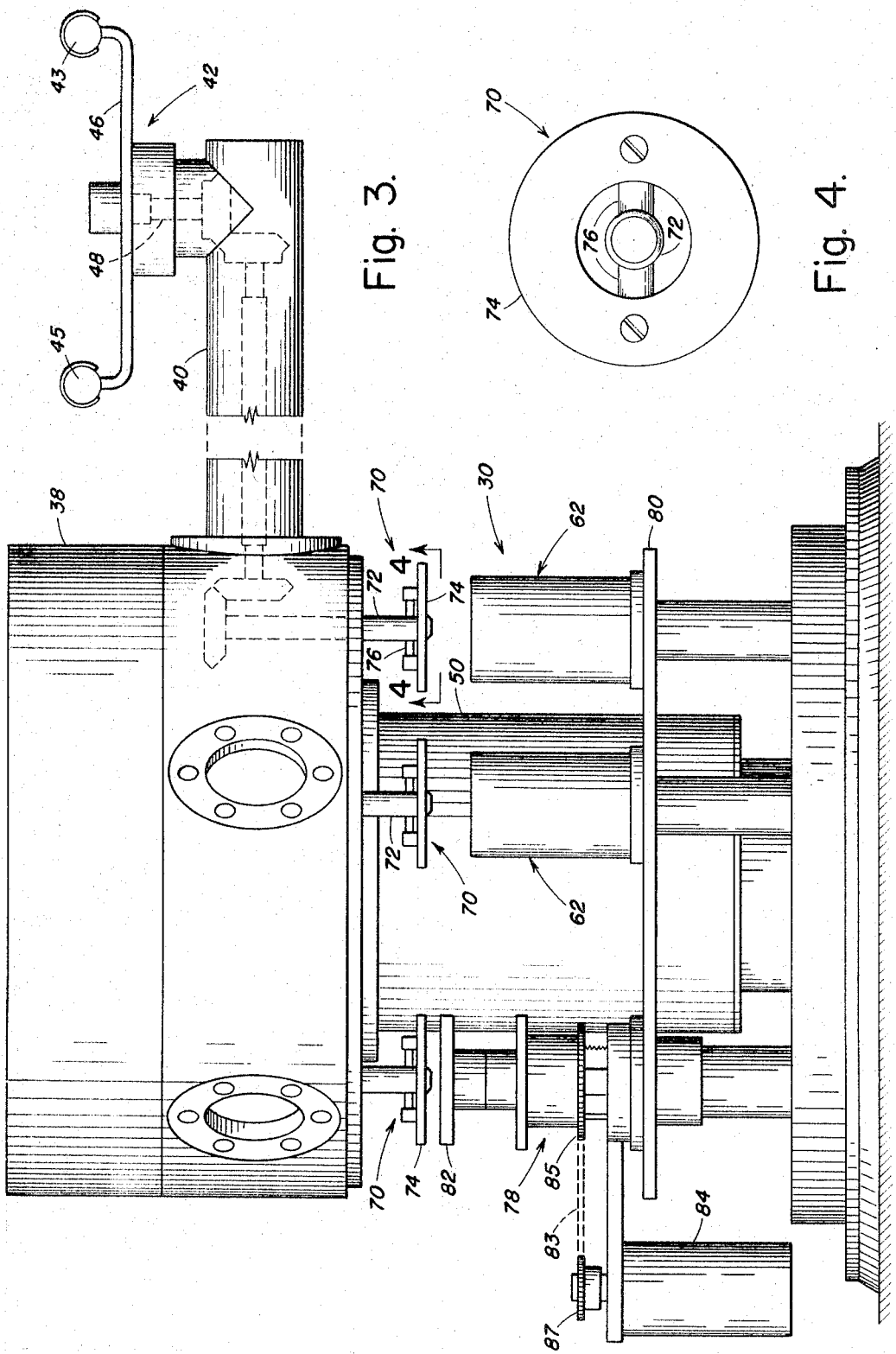

INVENTOR.
William M. Ripple
BY Frank J. Jordon
ATTORNEY

United States Patent Office 3,297,132
Patented Jan. 10, 1967

3,297,132
ORIENTATION DEVICE
William M. Ripple, Metairie, La., assignor to American Radiator & Standard Sanitary Corporation, New York, N.Y., a corporation of Delaware
Filed Feb. 19, 1965, Ser. No. 433,899
2 Claims. (Cl. 198—33)

This invention relates in general to an orientation means for use with a rotating article handling device, and more specifically to an orientation means for positively orienting a rotary device to the same given predetermined stationary position and for maintaining the stationary position thereof each time the orientation means is rendered operative.

In the manufacture of certain articles of manufacture, it has been found that the manufacturing thereof can be expedited by moving succeeding articles during a manufacturing process in a line through a series of operating stations in which the various manufacturing operations are successively performed. As the operating means or tool of the respective stations are prepositioned, it is often required that the article being worked on in a given station be oriented or positioned with respect to the operating means thereat and maintained stationary in the predetermined oriented position so that the operation may be properly performed.

It is therefore an object of this invention to provide an orientation means for positively prepositioning a rotating article device and an article supported thereon in a predetermined stationary position with respect to an operating means adapted to operate thereon.

It is another object of this invention to provide an orientation device for use with a rotatable article handling means in which the orientation device can be rendered operatively engageable with the article handling means regardless of the relative position therebetween.

The forgoing objects, and other features and advantages of this invention are attained in an article handling device comprising one or more support means for conveying an article thereon in a predetermined path through a series of successive operating stations spaced along the path and having means for successively indexing the article support means from one station to the next. The arrangement is such that the respective article support means are mounted for rotation about their respective axes of revolution so that when indexed to certain of the stations, the article support means will have a rotational movement imparted thereto, and when indexed to another station, the respective article support means therein are orientated to a predetermined fixed position relative to an operating means thereat and are maintained fixed during the operation being performed thereat.

In accordance with this invention the orientation means for prepositioning the article supports in a fixed or stationary position at a given station and maintaining the same fixed thereat comprises a clutch means connected in driving relationship with each of the respective article support means with the clutch means being arranged to be indexed with the associated article support from station to station. An orientation cam is positioned in each such station where orientation is desired. Accordingly, the orientation cam is arranged for movement between operative and inoperative relationship with respect to the clutch means.

The clutch means comprises generally an annular plate member having transversely extending roller means connected thereto. The cooperating orientation cam comprises a cylindrical member having an axial bore and a transversely extending slot which bifurcates the upper and end of the cam cylinder. Accordingly, the opposed portions of the bifurcated end are each formed with helical cam surfaces generated on the inner and outer surfaces thereof which cooperate to lead the transverse rollers of the clutch means into the bottom of the slot when the cam cylinder is moved into operative position with the clutch means. Actuating means are operatively connected to the cam cylinder to effect movement thereof between operative and inoperative position. The arrangement of the cam cylinder is such that the axis of its slot is fixed. Thus, when the helical cam surfaces of the cam are brought into engagement with the rollers of the clutch means, they cooperate to smoothly guide the rollers into the slot. In doing so the article support means operatively connected in driving relationship to the clutch means is driven and rotated to a position or direction corresponding or relative to the transverse axis of the slot. The actuating means thus maintains the cam cylinder engaged to the clutch means throughout the operating interval. Upon disengagement of the cam means from the clutch means, an on the completion of the operation at the given station, the article handling means is indexed to the next succeeding station an the operation is repeated on the following article.

A feature of this invention resides in the provision of an orientation means provided with opposed helically generated surfaces for positively insuring the orientation of a rotatable article supporting means indexed to a given station with a smooth uniform motion.

Another feature of this invention is to provide an orientating means which is relatively simple in construction and positive in operation.

Other features and advantages will be more readily noted when considered in view of the drawings and description in which:

FIGURE 1 illustrates a plan view of the apparatus for handling water closet tanks in which the orientation means of the instant invention is incorporated.

FIGURE 2 is an elevation view of FIGURE 1.

FIGURE 3 is an elevation view of a rotary handling device in which the orientation device of the instant invention is embodied.

FIGURE 4 is a bottom plan view of the driving clutch means taken along line 4—4 of FIG. 3.

Figure 5:
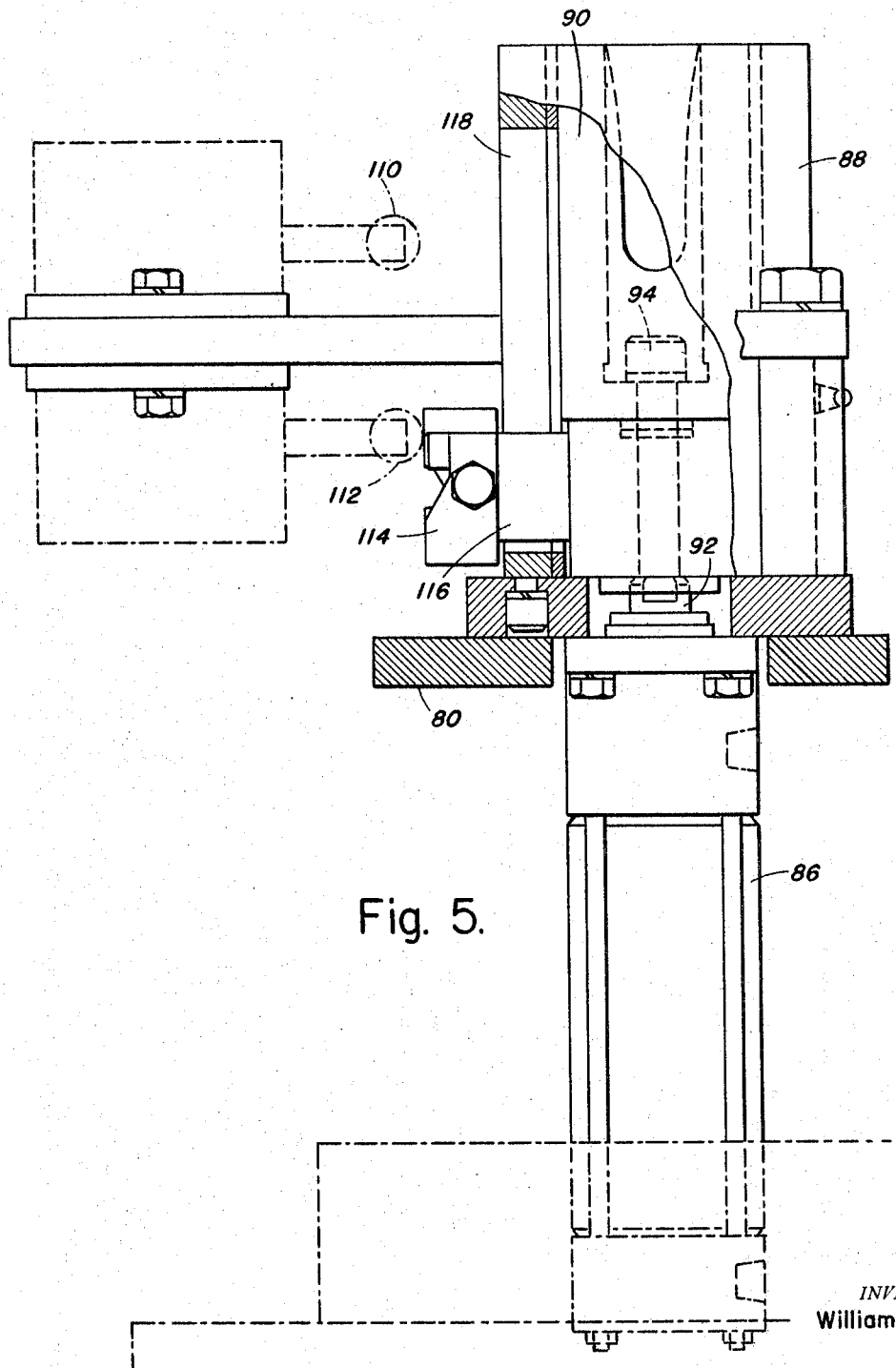
FIGURE 5 is a view of the orientation assembly means having parts shown therein in section.

Before explaining the present invention in detail it is to be understood that the invention is not to be limited in its application to the details and arrangement of the parts illustrated in the accompanying drawings, since the invention is capable of being utilized in other systems, and of being practised or carried out in various ways, and may be used in the manufacture of various articles. However, for purposes of description and understanding, the invention will be discussed as applied in an article handling device for expediting the spraying operation of water closet flush tanks with an enamel glaze during the manufacture thereof.

Referring to the drawings, there is shown in FIG. 1 a line of travel which a series of water closet flush tanks 20 may take in moving to and from a spraying apparatus 22 wherein the spraying is performed in a series of steps or operations. The line of moving tanks 20 start as they egress from an initial firing furnace or tunnel (not shown). The tanks leaving the furnace or tunnel are individually and successively transferred from a tunnel conveyor (not shown) to a feed conveyor 24. Any suitable means such as a manipulator 26 effects the transfer of tanks 20 from the tunnel conveyor to the feed conveyor. The feed conveyer 24 then conveys the tanks 20 generally along a straight line to a transfer mechanism 28 disposed at the end thereof. The transfer mechanism 28, which is more particularly described in a copending application S.N. 433,921, filed Feb. 19, 1965, is operative to rotate every other tank 180° so as to place every succeeding two tanks into paired back-to-back relationship, and thereafter transfer such back-to-back pairs to a rotary conveyor 30. The rotary conveyor 30 thus receiving the paired tanks moves the paired tanks through a series of circularly spaced stations 31A, 31B, 31C, 31D, and 31E.

Stations 31A and 31E comprise transfer stations, and stations 31B, 31C and 31D comprise spray stations, located within the spray booth 22 where the tanks are coated with an enamel glaze in a series of successively performed spraying operations. As the pairs of tanks emerge from the spray booth 22, they are then successively transferred from the carrier of the rotating conveyor 30 to a receiving conveyor 32 by means of another transfer mechanism 34, which is somewhat similar in construction and operation to transfer mechanism 28 of the feeding conveyor 24 with the exception that the means for rotating every other tank 180° is not required.

The feed conveyer 24 comprises a straight line belt conveyor of one or more endless belts suitably carried on end rollers 35, 36, one of which is suitably driven by a power means. Accordingly, the conveyer 24 is adapted to be periodically indexed as each tank is deposited on the belt to advance the tank toward the spray booth 22. The intermittent movement of the conveyer 24 thus provides the necessary space to receive the next tank from the manipulator 26. It will therefore be understood that the movement of the conveyer 24 is such that the tanks are equally spaced thereon, and that all tanks placed thereon are faced in the same direction.

The rotary conveyer means 30, in which the instant invention is incorporated, comprises essentially of a hub 38 which has connected thereto a plurality of radially extending arms 40 that extend outwardly therefrom. Article support means or carriers 42 are rotatably journalled adjacent the free ends of the respective arms 40. Accordingly, the carriers 42 provide the means upon which the paired tanks 20 are supported as they are advanced from station to station.

As seen in the drawings, the article support means or carriers 42 comprises a pair spaced parallel bars 43, 45 connected by a cross member 46. The cross member 46 in turn is operatively connected to a vertical spindle 48 about which the associated carrier 42 may rotate.

Accordingly, the hub 38 is rotatably journalled about a base 50 on a suitable bearing so that it can index the respective article carriers 42, connected thereto, through the series of successive operating stations 31A–31E circumferentially spaced about the hub.

To effect the indexing of the article carriers 42, a suitable indexing means is provided, which when actuated will advance the carriers 42 connected to the free end of each radial arm 40, successively through each of the stations 31A–31E spaced therearound.

As noted in FIG. 1, the support arms or bars 43 and 45 of each carrier 42, when disposed in each of the transfer stations 31A and 31E, are disposed so as to be in parallel with the longitudinal axis of the associate feed conveyer 24 or receiving conveyer 32. This is required so that the respective transfer mechanism 28 or 34 thereof may either deposit thereon or remove the pair of tanks therefrom. Accordingly, the arms 43, 45 must be correctly orientated with respect to the transfer means 28 or 34. In accordance with this invention, a means is provided to insure that arms 43 and 45 of the respective article support 42, when indexed to the respective transfer stations 31A, 31E, be positively orientated to receive the transfer means 28 or 34 therebetween, in a manner more particularly described in copending application Serial Number 434,008, filed Feb. 19, 1965.

The spray stations 31B, 31C and 31D disposed in the circular path disclosed are arranged so that the covers of the tanks are sprayed at station 31B, while the vertical walls of the paired tanks are sprayed at stations 31C and 31D. Preferably, the covers of the tanks are sprayed by an overhead spray device 58, the detailed construction of which is more particularly set forth in a copending application Serial Number 433,861, filed Feb. 19, 1965.

Briefly, overhead spray device 58, described in copending application Serial Number 433,861, comprises a movable spray head 59 carried on a trolley which reciprocates back and forth across the spray station 31B relative to tanks 20 which are orientated and maintained stationary relative thereto. Thus, as shown in FIG. 1, the position of the arms 43 and 45 of the carrier 42 supporting the paired tanks, when in station 31B, are orientated so as to be disposed in line which the spray apparatus 58. In the illustrated embodiment, this position is shown as normal to the position which the arms 43, 45 of such carrier 42 assumed when in station 31A. In this manner, the paired tanks are properly disposed relative to the spray head 59 of the spray apparatus 58.

To insure the proper relationship of the carriers in stations 31A, 31E and in station 31B there is provided, opposite each of the stations, an orientation device 62 for determining and maintaining the respective position of the carriers 42 thereat.

At stations 31C and 31D the vertical wall of the tanks are sprayed by rotating the respective carriers 42 and the tanks thereon about their respective axis of revolution to stationary spray nozzles 63, 64.

The rotary conveyor 30 is constructed and arranged, as more particularly defined in application S.N. 434,085, filed February 19, 1965, to index the respective article carriers 42 successively through stations 31A, 31B, 31C, 31D and 31E. It is to be noted that a clutch means 70 is operatively and mechanically connected in driving relationship with each of the respective carriers 42, which when actuated, will effect either the rotation or orientation of the carrier, depending on the particular station the carrier is indexed to. Accordingly, the clutch means 70 is indexed with its associated carrier 42 from station to station as the hub 38 is indexed.

The clutch means 70 of the respective carriers 42 comprise a shaft 72 which is suitably connected in driving relationship to its associated carrier 42. Accordingly, whenever clutch shaft 72 is rotated or positioned, the carrier 42 connected in driving relationship therewith is actuated to rotate or follow the clutch means 70 accordingly.

The clutch member mounted on the end of respective shaft 72 comprises an annular plate 74 having orientation rollers 76 extending diametrically thereof.

Orientation devices 62 are located at stations 31A, 31B and 31E. In operation, the orientation devices 62 are adapted to engage the orientation rollers 76 of the clutch means 70 of the carrier disposed at stations 31A, 31B and 31E to insure the proper positioning of the respective carriers 42 relative to the operating means operating on the tanks at stations 31A, 31B and 31E. For example, in stations 31A and 31E, it is imperative that the cross arms 43, 45 of the respective carriers 42 be disposed so as to be parallel with respect to the transfer means 28 or 34 thereat so that the tanks 20 may be either positioned or removed from the respective carrier. The carrier 42 at station 31B and the tanks supported thereon, on the other hand, are required to be predeterminedly positioned relative to the moving spray head 59 of a spray apparatus 58 located thereat.

As can best be seen in FIG. 3, the respective shafts 72 carrying the clutch means 70, by which the carriers 42 are driven or oriented extend below the bottom of the hub 38. Accordingly, as the hub 38 is indexed from station-to-station, the respective shafts 72 are also indexed from station-to-station therewith. Thus, it will be noted that at each station, the respective clutch means 70 is positioned to overlie either a drive mechanism 78, located at stations 31C and 31D, or an orientation device 62 located at stations 31a, 31B, and 31E.

Accordingly, the respective drive mechanism 78 and orientation devices 62 are each mounted on a stationary support portion 80 of the rotary conveyor 30. The arrangement of the drive mechanism 78 is such that a complementary clutch plate 82, operatively connected to a suitable rotary device 85 is brought into and out of engagement with the overlying clutch means 70. Thus when the actuation of the drive means 70 is affected the carrier operatively associated therewith is rotated about its respective spindle upon actuation of the rotary device or motor 84.

In accordance with this invention orientation devices 62 are located underneath the hub 38 opposite each of stations 31A, 31B and 31E. Each of the respective orientation devices 62 are substantially similar in construction and therefore only one need be described for the purpose of understanding the instant invention.

Referring to FIGS. 5 to 10, each of the orientation devices 62 comprises a power operated cylinder 86 mounted on the stationary support 80 of the hub. A cylindrical housing 88 is also supported in alignment with the actuating cylinder 86. In accordance with this invention, a cam 90 is suitably secured to the end of the piston rod 92 of the power actuating cylinder 86 by means of a suitable fastener or bolt 94. Accordingly, the cam 90 is reciprocally mounted for movement within the housing 88.

Referring to FIGS. 6 to 10, the details of the orientation cam 90 comprises a cylindrical member 96 which is provided with an axial bore 98 extending to the base 99 thereof. The bore 98 is provided with a diameter that is slightly larger than the diameter of the shaft 72 supporting the respective clutch means 70 of the respective carriers 42. Accordingly, the arrangement is such that the bore 98 of the cylindrical cam member 96 will accommodate the shaft 72 when the orientation cam 90 is raised by the power actuator cylinder 86, as will be hereinafter described.

Figure 6:
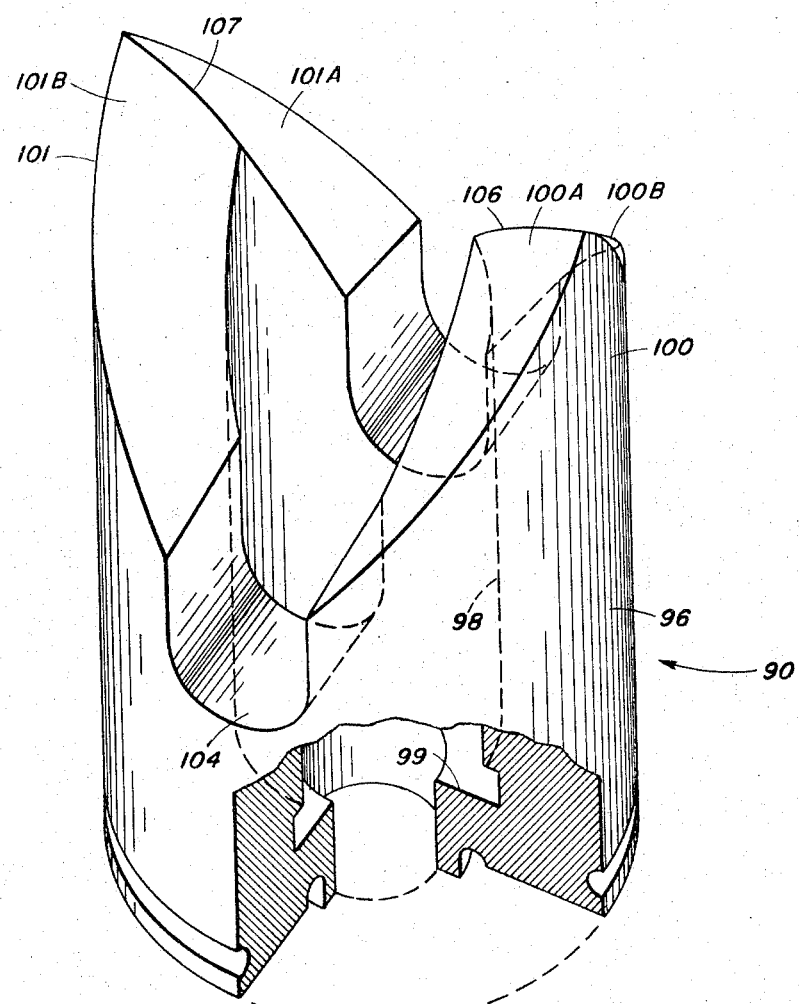
FIGURE 6 is a detail perspective view of the orientation cam of the instant invention.
Figure 10:
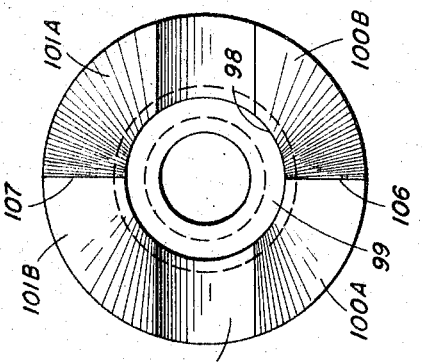
FIGURE 10 is a top view of the orientation cam of FIG. 7.
Figure 7:
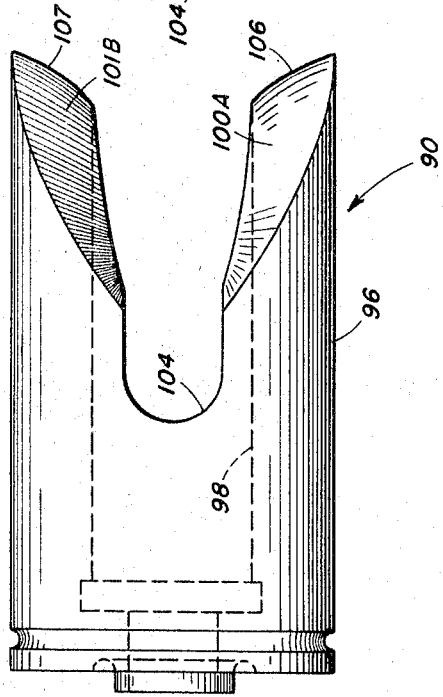
FIGURE 7 is a side elevation view of the orientation cam of FIG. 6.
Figure 9:
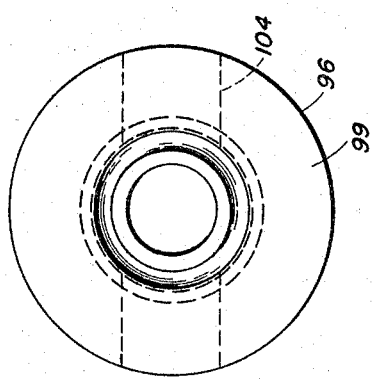
FIGURE 9 is a bottom view of the orientation cam of FIG. 7.
Figure 8:
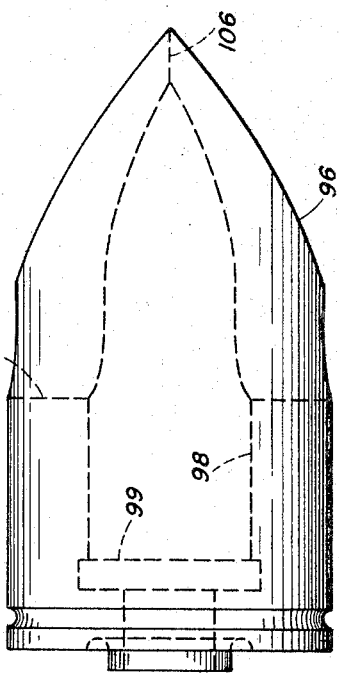
FIGURE 8 is an elevation view of FIG. 7.

The upper end of the cam 90 is bifurcated to define opposed portions 100 and 101. As best seen in FIG. 6, the cam member 90 is provided with a transversely extending U shape slot 104 which defines the base or bottom of the bifurcated end portions 100, 101. As will be hereinafter described, the slots 104 are adapted to accommodate the orientation rollers 76 of an associated clutch means 70 when the latter is indexed to either of stations 31A, 31B or 31C. The slot 104 is thus sized so as to readily accommodate the orientation rollers 76 of an associated clutch means 70 so as to provide for a minimum of lost motion therebetween when the cam 90 is operatively engaged.

In accordance with this invention, the edges of the opposed portions 100, 101 of the bifurcated cam end are each formed with a complementary cam surfaces, which are generated in a helix on the inner and outer sides thereof. Accordingly, the diametrically opposed edges 100A, 101A of the opposed portions 100, 101 are defined as a helix that leads into the slot 104. Also, diametrically opposed edges 100B and 101B cooperated to define helical cam surfaces that lead in the slot 104. In the finished cam 90, it will be noted that the generated helical surfaces formed at 100A, 100B and 101A, 101B on the opposed edges of portions 100 and 101 of the bifurcated end intersect in an inwardly curved line 106, 107 at the topmost end thereof. If desired, the helical surfaces 100A, 100B, and 101A, 101B of the respective end portions 100, 101 may be generated so that the respective lines of intersection 106, 107 define at the upper bifurcated end of the cam may be laterally offset so that the respective lines 106 and 107 are positioned on opposite sides of a diametric plane disposed normal to the axis of the slot 104.

Means are provided for rendering the cam at the respective stations 31A, 31B and 31E operative to engage with the associated clutch means 70 indexed thereat. In the illustrated embodiment, the orientation cam 90 is secured to the end of the piston rod 92 of its respective associated actuating cylinder assembly 86, so as to be fixed against rotation. Thus, once assembled, the axis of the slot 104 is fixed. Accordingly, the respective slots 104 of the orientation means in station 31A and 31E are orientated so that when rollers 76 of the overlying clutch means 70 are engaged, the arms 43, 45 of the carrier 42 driven thereby are oriented parallel to the axis of the associated transfer means 28 or 34.

In station 31B, engagement of the cam 90 with the cylindrical rollers 76 of the overlying clutch means 70 effects orientation of the associated carrier 42 so that the articles supported thereon are held stationary in longitudinal alignment with the moving spray head 59 of the spray apparatus 58.

In operation of the cam means 90, if the orientation rollers 76 of the respective clutch means 70 at stations 31A, 31B and 31E are disposed in axial alignment with the slot 104 of the respective cam member 90, then raising of the cam member 90 will cause the orientation rollers 76 of the respective clutch means 70 to be received directly in the respective slots 104 of the cam members, which insures that the carriers associated therewith are correctly positioned and maintained thereat during the transfer of articles at stations 31A or 31E or during the spraying operation at station 31B. However, in the event that the orientation rollers 76 of the respective clutch means 70 are not in an aligned position with the slots 104 of the respective cam members, then raising of the cams will cause the helical surface generated on the opposite edges thereof to engage the orientation rollers of the overlying clutch means, thereby causing the rollers to be lead or guided by such surfaces in a uniform and smooth manner into the slot 104. In doing so the shaft 72 of the associated clutch means 70 is rotated accordingly to orient the carrier 42 as predetermined by the relative position of the cam slot 104. From the above description it will be noted that whenever the orientation cams are raised they will engage with the orientation rollers 76 of the associated clutch means irrespective of the relative position between the axis of the roller 76 and axis of the slot.

The cams 90 along with the shafts 72 and the driving connection to the respective carrier operatively connected thereto are designed so that whenever the respective orientation rollers 76 are accommodated in the slot 104 of the respective cam members 90, the carriers are in proper orientation.

If desired suitable controls and safety devices may be utilized to control the up and down movement of the cam 90. For example, limit switches 110, 112 fixedly mounted, may be disposed to be actuated by an operator 114 connected for up and down movement with the piston rod 92 by a bracket 116 which slides in a slot 118 formed in cam housing 88.

Having described the construction of various component parts, the operation of the device is as follows:

The transfer device 28 places two tanks 20 in back-to-back relationship on the arms of the carrier 42 located at station 31A. During transfer, at this station, the orientation device 62 is actuated so that the cam 90 is brought into engagement with the orientation rollers 76 of the associated clutch means 70 to insure that the carrier is properly orientated as shown in FIG. 1 to receive the tanks. After the tanks have been placed on the carrier at station 31A, the orientation cam 90 is withdrawn by the actuation of the cylinder asembly 86, and the conveyor 30 is indexed to the next station.

At station 31B another orientation device 62 is provided to orientate the carrier 42 thereat to a position substantially shown in FIG. 1, so that the tanks supported thereon are predeterminedly positioned with respect to an overhead spraying device 58, previously mentioned. During the spraying operation at station 31B, the orientation cam 90 is left in its engaged position to insure that the carrier thereat is maintained in the predetermined fixed position. After the covers of the tanks 20 have been sprayed, the orientation cam 90 at station 31B is disengaged from the clutch means 70, and the rotary conveyor 30 again indexed.

At station 31C, the clutch means 70 of the associated carrier 42 is operatively connected to the clutch drive means 78 to effect rotation of the carrier 42 about its spindle 48 so that the articles thereon rotate relative to a fixed laterally disposed spray head 63. In this manner the vertical walls of the paired tanks are sprayed on all sides thereof except on the back part thereof which are closely disposed.

After the sides of the tanks have been sprayed the clutch plate 74 is disengaged from the clutch plate 82, and the conveyer 30 is again actuated to advance it to the next station. At station 31D, the sides of the tanks are given another coating, and here again the carrier 42, indexed thereat, is rotated past a stationary spray head 64 in a manner similar to that previously described with respect to station 31C. Accordingly, the carrier 42 is rotated in the same manner using another clutch drive mechanism 78 which is disposed at station 31D. However, the respective clutch drive mechanisms 78 at each of stations 31C and 31D may be commonly driven. This is attained by an endless chain 83 suitably threaded over sprockets 85 of the drive means 86 at station 31C and 31D, and the drive sprocket 87 of single motor means 84.

After applying the second coat of spray, the clutch plates 74 and 82 at station 31D are disengaged and the rotary conveyor once again advances to the next station 31E. At the next station, 31E, another orientation device 62 is actuated to orientate the carrier 42 to a position substantially shown in FIG. 1 so that the transfer mechanism 34 of the receiving conveyer 32 can be moved between the cross arms 43, 45 of the carrier to lift and remove the tanks therefrom. The orientation cam 90 at station 31E is then withdrawn as herein described and the rotary conveyor advanced to the next station 31A wherein the cycle of operation is repeated.

Although the above description traces the path of travel of the paired tanks as the latter progress through various stations, it will, of course, be understood that the above described operation at the various stations are going on simultaneously as different pairs of tanks are advanced.

As best seen in FIG. 1 the spraying operations at stations 31B, 31C and 31D are performed within an enclosed booth so that all excess spray is confined within the booth and does not contaminate the surrounding atmosphere. Also, it is to be observed that the various mechanical components of the rotary conveyer are protected from the spray. Thus, the hub 38 houses the various gears and drive means as do the hollow arms 40. Also, the clutch drive mechanism and the orientation mechanisms are enclosed within the hub. Thus, the working components are sielded from any of the excess of enamel spray which would otherwise adversely effect the mechanical operating parts if they were not suitably enclosed.

While the various mechanisms have been described with referenced to a particular embodiment thereof it will be readily understood and appreciated that variations may be made without departing from the spirit and scope of the invention.

What is claimed is:

1. An orientation cam adapted to orient a rotatable means to a predetermined stationary position relative to its axis of rotation and to maintain the same thereat comprising:
    (a) a cylindrical member having an axial bore extending thereinto and a diametrically extending slot disposed normal to said bore said slot being disposed intermediate the longitudinal length of said member,
        said member having a bifurcated end portion extending above said slot to define a pair of opposed end portions,
        the opposed end portions having their respective diametrically disposed edges formed as a cooperating camming surface generated in the form of a helical surface of said cam,
    (b) actuating means operative for moving said cam number between operative and inoperative positions, and
    (c) a housing disposed about said cam number to guide the same between operative and inoperative positions.

2. The invention as defined in claim 1 wherein said actuating means includes:
    (a) a piston and cylinder assembly, said assembly having a piston rod, and
    (b) means for connecting said cam member to the end of said piston rod.

References Cited by the Examiner

UNITED STATES PATENTS 2,870,922   1/1959   Thomson.

FOREIGN PATENTS 651,805   10/1934   France.

EVON C. BLUNK, Primary Examiner.

EDWARD A. SROKA, Examiner.